United States Patent [19]

Iozzi

[11] 4,306,416
[45] Dec. 22, 1981

[54] CLOSED CYCLE, HYDRAULIC-TURBINE HEAT ENGINE

[76] Inventor: Joseph Iozzi, Two River Rd., Hancock, N.Y. 13783

[21] Appl. No.: 39,207

[22] Filed: May 15, 1979

[51] Int. Cl.$^3$ .............................................. F03G 7/02
[52] U.S. Cl. .................................. 60/641.11; 60/660; 60/671
[58] Field of Search ................. 60/641, 651, 671, 675, 60/660, 641 A, 641 AE

[56] References Cited

U.S. PATENT DOCUMENTS

| 196,759 | 11/1877 | Miller | 60/675 |
|---|---|---|---|
| 1,493,368 | 5/1924 | Merz | 60/641 |
| 3,358,451 | 12/1967 | Feldman et al. | 60/671 X |
| 3,414,481 | 12/1968 | Kelly | 202/234 |
| 3,790,305 | 2/1974 | Ledner | 417/53 |
| 3,861,148 | 1/1975 | Bailey et al. | 60/671 X |
| 3,945,218 | 3/1976 | Parker | 60/641 |
| 3,953,971 | 5/1976 | Parker | 60/641 |
| 3,983,704 | 10/1976 | McFarland | 60/641 |
| 3,995,429 | 12/1976 | Peters | 60/641 |
| 4,010,614 | 3/1977 | Arthur | 60/641 |
| 4,012,911 | 3/1977 | Gulko | 60/641 X |
| 4,030,303 | 6/1977 | Kraus et al. | 60/688 |
| 4,087,975 | 5/1978 | Owens | 60/641 |
| 4,187,686 | 2/1980 | Pommier | 60/641 X |
| 4,192,145 | 3/1980 | Tanaka | 60/675 |

*Primary Examiner*—Allen M. Ostrager
*Assistant Examiner*—Stephen F. Husar
*Attorney, Agent, or Firm*—Brumbaugh, Graves, Donohue & Raymond

[57] ABSTRACT

A closed cycle, hydraulic-turbine heat engine for providing a steady electrical or mechanical power source from any available or created relative heat source comprising an evaporation chamber, a vapor conduit connected to the evaporation reservoir and extending vertically therefrom, a condensing reservoir at the upper end of the gas conduit, and a liquid conduit between the condensing reservoir and the evaporation chamber. The liquid conduit, vapor conduit, evaporation chamber, and condensing reservoir form a closed system for containing a refrigerant. A heat exchanger coupled to an external heat source is arranged to provide heat to the refrigerant in the evaporation reservoir, and a condenser, coupled to a heat sink, condenses refrigerant vapor entering the condensing reservoir from the vapor conduit. A pressure regulating device responsive to a characteristic temperature of the system regulates the pressure in the closed system to raise or lower the boiling point of the refrigerant, so that the system is operable over a wide range of operating conditions and ambient temperatures. A turbine is positioned in the liquid conduit for coverting the flow of liquid refrigerant through the conduit into useful mechanical or electrical energy.

3 Claims, 1 Drawing Figure

CLOSED CYCLE, HYDRAULIC-TURBINE HEAT ENGINE

BACKGROUND OF THE INVENTION

The present invention is a pollution free, closed cycle, hydraulic-turbine heat engine which operates readily from any environmentally available or created relative heat source or temperature differential, for example from solar or geothermal energy, to generate useful mechanical or electrical energy. It is especially adapted to operate as an individual unit for homes or small factories.

A number of heat engines, which operate from occuring or created heat sources, have been proposed in the past. Typically, these involve a high pressure, high velocity heat exchange cycle, in which a refrigerant having a boiling point lower than the heat source is placed into heat exchange relationship with the heat source and evaporated in a high pressure closed chamber. The vapor, under pressure, is directed through a high speed gas turbine to generate electricity.

In addition to the operating hazards of high pressure steam or gas, engines of this type usually require a substantial heat input and substantial temperature differentials (between various phases of the cycle) to operate efficiently. The high throughput of vapor needed to operate the turbine necessitates complicated piping and ducting, as well as the associated pumps, safety valves, and other such regulatory equipment. This renders such engines impractical, from both space and cost standpoints, for all but high output commercial applications.

Also, variable heat source and heat sink temperatures can cause these systems to operate inefficiently, or, with too great a temperature variance, can render them inoperable. Engines of this type possess no inherent energy storing capabilities, and without separate accommodation, they operate only so long as a heat input is maintained. Thus, although theoretically adaptable to a variety of heat energy sources, as a practical matter most heat engines are unsuitable for all but a limited number of applications, and particularly, to large temperature differentials of controlled, steady heat sources. These cost and performance drawbacks render most heat engines or power generation systems using heat engines impractical for an individual home or small factory, or other such applications requiring modest but steady and reliable power output.

SUMMARY OF THE INVENTION

The present invention is a closed cycle hydraulic-turbine heat engine which is relatively uncomplicated and thereby inexpensive in structure and which may be used as an individual unit for supplying the on site electrical needs of a residential home, or the electrical or mechanical needs of a small factory. The engine is pollution free, operates without high gas or steam pressures in the system, without a gas or steam turbine, and without the need for high temperatures or high temperature differentials. The unit is capable of operating from a wide variety of heat sources, for example solar, geothermal, or waste heat, and is extremely adaptable to the particular heat source chosen. The heat engine is capable of operating not only from a heat source which provides only a small temperature differential, but a heat source which is variable in tempearture or intermittent. The unit has a built-in energy storage capacity to produce a steady output despite fluctuations or interruptions of heat input, and the operating cycle of the system is responsive to the instantaneous heat source and heat sink conditions such that the unit operates at peak efficiency over a wide variety of ambient conditions or changeable source and ambient conditions. This extremely adaptable heat engine produces a reliable, cheap, and steady output of electricity or mechanical energy.

More specifically, a heat engine according to the invention operates from a remote heat source, for example a solar collector. An evaporation chamber of the heat engine containing refrigerant, is in heat exchange contact with the collector. Liquid refrigerant in the evaporation chamber absorbs input heat and, once gaseous, moves by pressure build up and convection up a vertically extending vapor output conduit. The vapor conduit opens into the upper portion of a condensing reservoir. A heat extractor, for example with cooling pipes or cooling fins, is placed in the condensing reservoir to act as a heat sink and condense the entering vapor, which is then stored in the reservoir, the condensed liquid refrigerant representing gravity potential energy. The closed system is completed by a liquid conduit between the lower end of the condensing reservoir and the evaporation reservoir.

A turbine in the lower end of the liquid conduit extracts (kinetic) energy from the flowing liquid refrigerant to provide an output of useful mechanical or electrical energy. A pressure adjustment device responsive to a characteristic temperature of the system is also provided for varying the pressure in the closed system thereby to raise or lower the boiling point of the refrigerant, depending upon operating conditions, so that the heat engine operates efficiently over a wide range of ambient temperatures or heat inputs.

The heat engine also operates from any available relative heat source. By "relative heat source", it is meant that the heat source temperature is greater than the available heat sink temperature. Thus either the heat source or heat sink may be at ambient temperature, as long as the temperature differential exists.

In a preferred form of the device, hot water from a solar collector panel communicates through a circulation duct to the heat exchanger. The duct contacts the vapor conduit along at least part of its length to help maintain the refrigerant in its gaseous state until it reaches the condensing chamber. If desired, a fan may be placed in the gas conduit for forced convection of the gas upwards toward the condensing reservoir. A governor is also provided in the liquid conduit for regulating the flow of liquid through the turbine, and thereby the electrical or mechanical output. The governor may be incorporated as part of the turbine itself.

The heat engine according to the present invention, when coupled to a generator, supplies a steady continuous output of electricity over long periods of time and variable operating conditions. It is ideally suited for supplying the electrical needs of individual homes or providing a cheap, steady source of energy for electrolysis. As opposed to an electrical output, the turbine could provide a mechanical output, for example to be used in factories.

For a better understanding of the invention, reference may be had to the following detailed description, taken in conjunction with the accompanying drawing.

DETAILED DESCRIPTION OF A PREFERRED EMBODIMENT

Figure 1:
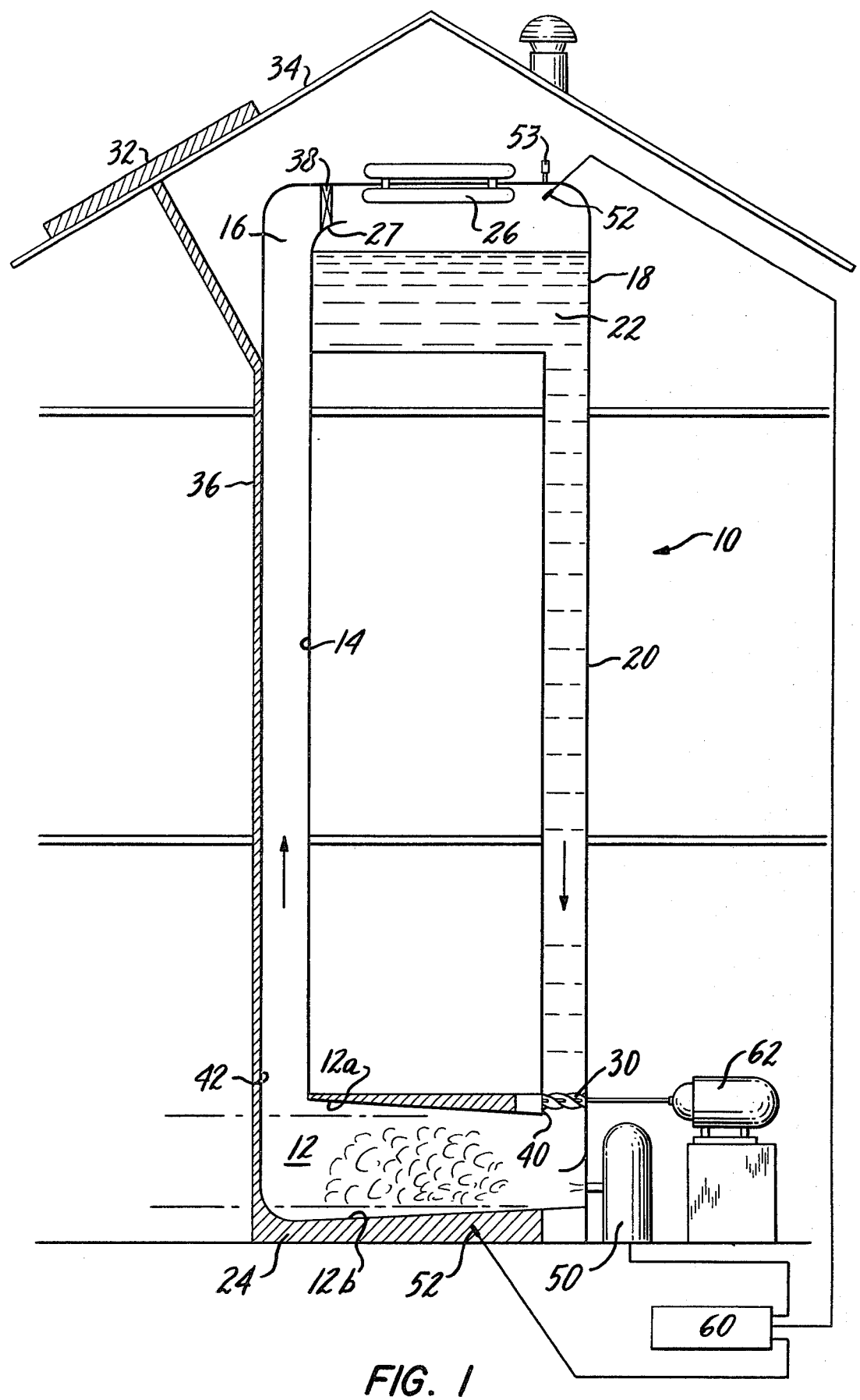
FIG. 1 is a schematic representation of a closed cycle hydraulic-turbine heat engine in accordance with the present invention.

Referring to the drawing, a closed cycle hydraulic-turbine heat engine 10 is disposed within the interior walls of a house for generating electricity. The unit comprises an evaporation chamber 12 having a vapor outlet conduit 14 extending vertically therefrom, a condensing reservoir 18 connected to the upper end of the vapor conduit 14, and a return liquid conduit 20, with a hydraulic turbine 30 arranged therein, connected between the lower end of the condensing reservoir 18 and the evaporation chamber 12.

The liquid conduit 20, vapor conduit 14, the evaporation chamber 12 and the condensing reservoir 18 form a closed system for a two-phase refrigerant heat exchange cycle.

The evaporation chamber 12 has an inlet 40 connected to the liquid conduit 20 and an outlet 42 connected to the vapor conduit 14. The upper wall 12a of the evaporation chamber 12 is sloped upwardly toward the outlet 12 so that gas formed in the chamber 12 is directed toward the gas conduit 14 and will not stagnate on the upper wall 12a or move toward the liquid conduit 20. Also, the lower wall 12b of the evaporation chamber 12 is sloped downwardly toward the outlet side of the chamber such that liquid refrigerant 22 which has passed through the turbine 30 flows away from the turbine 30 toward the outlet side of the chamber 12.

Heat may be provided to the heat exchanger 24 from any available heat source, for example, a naturally occurring heat source (geothermal, lake water warmer than ambient air (or vice versa), waste heat from industrial processes, the waste heat from a furnace in a factory or home), or a created heat source (solar panels). Two or more heat sources may also be used, together or selectively (if, for example, each occurred intermittently or alternatively). In the illustrative embodiment, a solar collector 32 is positioned on the roof 34 of the house. Hot water in the pipes of the solar collector 32 is circulated, by any suitable means, through a duct 36 from the collector 32 to the heat exchanger 24 and back (via a separate duct) to the collector 32. As shown in the drawing, the duct 36 is also in heat contact relationship with the vapor conduit 14 along at least part of the length of the vapor conduit 14 to help maintain the refrigerant in a gaseous state as it travels through the vapor conduit 14.

The upper end 16 of the vapor conduit 14 opens into the condensing reservoir 18, where the incoming refrigerant gas is directed through a plurality of heat exhange cooling rods 26 to condense the gas. A cooling medium, e.g. water, is pumped through the rods to act as a heat sink. In place of the cooling rods, 26, any other heat exchange medium will suffice, for example fins, or the condenser walls themselves, cooled by the ambient temperature of the surroundings. A fan 38 may also be placed in the upper end 16 of the gas conduit 14 as a means of force convection of the gaseous refrigerant. Once condensed, a lip 27 prevents backflow of the liquid refrigerant 22 down the vapor conduit 14. Instead the liquid phase 22 is directed entirely through the liquid conduit 20, so that the weight of the liquid refrigerant 22 in the reservoir 18 and liquid conduit 20 acts on the refrigerant driving the turbine 30. A pressure relief valve 53 may also be connected to the system.

In operation, heat input to the solar collectors 32 is transmitted through the duct 36 to the heat exchanger 24 to evaporate liquid refrigerant 22 in the evaporation reservoir 12. The refrigerant gas, through convection or forced convection by the fan 38, and with a rise in vapor pressure, rises through the gas conduit 14 into the condensing reservoir. Upon entering the condensing reservoir 18, the gas is directed through the cooling rods 26 or fins, and, upon condensation, is collected in the reservoir 18. Condensed liquid 22 in the reservoir passes through the liquid conduit 20, through a turbine 30 and back into the evaporation reservoir to complete the cycle.

Output, either electrical or mechanical, is extracted from the turbine 30, for example, by a generator 62 coupled to the turbine shaft. Flow through the turbine 30, and thus the output energy, is regulated by a governor, which may be part of the turbine 30 itself. Since the controlled flow from the reservoir 18 through the turbine occurs independent of the evaporation portion of the cycle, a steady output of electricity is generated even with fluctuating heat inputs into the engine or during interruption of heat input (the length of such interruption before output is affected depending upon the capacity of the reservoir).

Operating pressure within the closed system is controlled by a pressure regulating device 50. Ambient temperatures may tend to vary over a wide range from day to day, which affects the cooling power of the cooling rods 26 or fins, as well as the heat losses in the system. Moreover, heat input may vary considerably depending upon conditions (in the case of a solar collector 32, for example, depending upon seasons, temperature and cloudiness). Regulating the system pressure allows the heat engine to adapt to the particular conditions. Raising the gas pressure in the system lowers the boiling point of the working fluid, as might be required in the case of reduced heat input. Reducing the system pressure raises the boiling point, and thus condensing temperature of the working fluid when desired, if, for example, less cooling were available.

Temperature probes 52 (connected, e.g. to a potentiometer, not shown), placed in the heat exchanger 24 and adjacent the cooling rods 26 or fins monitor the temperature of the evaporation causing fluid from the solar collector 32 and the cooling capacity (temperature) of the rods 26 or fins in the upper end of the heat engine. The probes 52 are connected to a controller 60 acting on the pressure regulator 50, to lowered the system pressure (and thus lower the refrigerant boiling point) when the heat exchanger 24 temperature falls below a predetermined minimum, and to raise the system pressure (and thus raise the refrigerant condensing point) when the temperature of the cooling rods 26 rises above a predetermined maximum. Thus the boiling (and condensing) temperature of the refrigerant is constantly adjusted to remain between the temperature in the evaporation chamber and in the condensing reservoir.

The preferred boiling temperature of the refrigerant depends upon the relative efficiency of the heat exchange, and thus the prevailing temperatures, in both the evaporator 12 and the condensor 18. If the efficiencies were equal, the ideal boiling point, for maximum evaporation and condensation, would lie halfway between the two temperatures (of the heat exchanger 24 and the cooling rods 26). Preferably, the controller 60 actuates the pressure regulator 50 to maintain the optimum boiling point.

The choice of refrigerant is likewise influenced by the prevailing system temperatures and has a boiling point lower than the prevailing temperatures of the heat source and higher than the temperature of the cooling rods or fins. The refrigerant chosen preferably also has a low latent heat of vaporization. This facilitates changes of state with minimum heat input in the evaporation chamber 12, and minimum cooling requirements in the condensor 18, and thus provides a maximum circulation of refrigerant through the system with a minimal temperature differential between the heat source and heat sink.

Finally, the system can be tailored to the individual requirements of the consumer. The maximum power output capability of the heat engine depends upon several interrelated factors, e.g. the height of the liquid column in the liquid conduit and the cross-sectional size of the liquid conduit (affecting the weight force of the liquid on the turbine), the heat sink and heat source temperatures, and the heat transfer efficiencies, which can thus be chosen according to need. It is anticipated that a unit of about 20-30 feet will supply the electrical needs of an individual home.

The self-contained heat engine according to the invention operates safely, efficiently, and pollution free with a minimum of temperature difference between the input 12 and extraction 18 portions of the cycle (since the pressure regulator 52 maintains the evaporation temperature between the two), without high operating pressures or high velocity gas turbines, and produces steady, reliable power over a wide range of steady state or variable heat source inputs. At the same time, the unit does not require the usual sophisticated, expensive, and high maintenance components usually associated with heat engines, and is thus practical for use in homes and small factories as an individual supply of electricity or mechanical power.

The above described embodiment represents one form of the invention. Modifications and variations of this embodiment, without departing from the inventive concepts disclosed herein, will be apparent to those skilled in the art. For example, instead of using a higher temperature heat source and ambient air as the heat sink, the ambient temperature may act as the heat source for a low boiling point liquid, where a colder heat sink is available, as long as a "relative" heat source (i.e. temperature differential) is available. All such modifications and variations are intended to be within the scope of the present invention, as defined in the following claims.

I claim:

1. A closed cycle, hydraulic-turbine heat engine for supplying electrical or mechanical power for a building, comprising:

(a) an evaporation chamber for containing a refrigerant and a vapor of said refrigerant, forming respectively a liquid containing zone and a vapor containing zone thereabove;

(b) a condensing reservoir vertically spaced from said evaporation chamber and supported by said building for containing a combination of said refrigerant and said vapor, forming respectively a liquid-containing zone and a vapor-containing zone thereabove;

(c) a vapor conduit communicating between the vapor containing zone in said evaporation chamber and the vapor containing zone in said condensing reservoir, and sized to permit convective transfer of vapor without resistance to said condensing chamber;

(d) a liquid conduit communicating between the liquid containing zone of said condensing reservoir and said evaporation chamber, the liquid conduit, vapor conduit, evaporation chamber, and condensing reservoir forming a closed system for containing said refrigerant;

(e) heat source means having a heat exchanger disposed in the liquid containing zone of said evaporation chamber for evaporating the refrigerant;

(f) heat sink means having a heat exchanger disposed in the vapor containing zone of said condensing reservoir for condensing refrigerant vapor entering said reservoir from said vapor conduit;

(g) means for preventing liquid refrigerant in said reservoir from flowing back down said vapor conduit and for directing vapor in said evaporation chamber toward said vapor conduit and away from said liquid conduit;

(h) pressure detection means in one of the vapor containing zone of said evaporation chamber, the vapor containing zone of said condensing reservoir, and said vapor conduit for detecting the pressure of said refrigerant vapor;

(i) means for detecting the temperature in said heat source and heat sink;

(j) pressure regulating means including control means responsive to said detected temperatures for varying the pressure in the closed system thereby to raise or lower the boiling point of the refrigerant;

(k) turbine means in said liquid conduit for converting the flow of liquid refrigerant through the liquid conduit into useful energy; and (l) governor means for regulating the flow of liquid into said evaporation chamber.

2. A heat engine according to claim 1, wherein said heat source means comprise a solar collector and heat transfer means in heat exchange contact with the vapor conduit along at least part of its length.

3. A heat engine according to claim 2, wherein said evaporation chamber has an upper wall sloped upwardly toward said vapor conduit for directing vapors in said evaporation chamber toward said vapor conduit and away from said liquid conduit.

* * * * *